United States Patent
Ghouse Mohaddin

(10) Patent No.: US 11,425,011 B2
(45) Date of Patent: Aug. 23, 2022

(54) SYSTEM AND METHOD FOR REAL TIME MONITORING A PLURALITY OF NETWORK DEVICES

(71) Applicant: Zensar Technologies Limited, Pune (IN)

(72) Inventor: Azeemuddin Shujauddin Ghouse Mohaddin, Herndon, VA (US)

(73) Assignee: ZENSAR TECHNOLOGIES LIMITED, Pune (IN)

( * ) Notice: Subject to any disclaimer, the term of this patent is extended or adjusted under 35 U.S.C. 154(b) by 0 days.

(21) Appl. No.: 17/172,654

(22) Filed: Feb. 10, 2021

(65) Prior Publication Data

US 2021/0250262 A1 Aug. 12, 2021

(30) Foreign Application Priority Data

Feb. 10, 2020 (IN) .............................. 202021005686

(51) Int. Cl.
G06F 15/16 (2006.01)
H04L 43/08 (2022.01)
H04L 43/0805 (2022.01)
H04L 43/045 (2022.01)

(52) U.S. Cl.
CPC ............ *H04L 43/08* (2013.01); *H04L 43/045* (2013.01); *H04L 43/0805* (2013.01)

(58) Field of Classification Search
CPC .... H04L 43/08; H04L 43/045; H04L 43/0805
See application file for complete search history.

(56) References Cited

U.S. PATENT DOCUMENTS

| 6,456,306 B1 | 9/2002 | Chin et al. |
| 2004/0133667 A1* | 7/2004 | Chen .................. H04L 41/06 709/223 |
| 2013/0322265 A1 | 12/2013 | Kozisek et al. |
| 2015/0172143 A1* | 6/2015 | Degioanni .......... H04L 67/1097 370/252 |

(Continued)

FOREIGN PATENT DOCUMENTS

CN 105430091 A 3/2016

OTHER PUBLICATIONS

ITT Systems "Router Monitoring Tools & Software for Cisco, Juniper, Sonicwall and More!", dated Feb. 12, 2021 (16 pgs).

*Primary Examiner* — Padma Mundur

(74) *Attorney, Agent, or Firm* — Shumaker, Loop & Kendrick, LLP

(57) ABSTRACT

A system and a method for real time monitoring a plurality of network devices. The processor may be configured for polling granular data associated to a plurality of network devices at a periodic time interval based upon a plurality of predefined parameters. The processor may generate one or more structured queries based upon one or more of the plurality of predefined parameters to retrieve granular data stored in the database. The processor may receive a response corresponding to the one or more structured queries generated. The processor may compare the response with a predefined criteria set for a key performance indicator (KPI) associated to each of the one or more network devices. The processor may update a UI component using an update query and display real time insights on a GUI associated to a user based upon the updated UI component.

20 Claims, 4 Drawing Sheets

(56) References Cited

U.S. PATENT DOCUMENTS

2016/0105330 A1* 4/2016 Choudhary ............. H04L 43/04
715/736
2019/0238403 A1* 8/2019 Wang ...................... H04L 41/12

* cited by examiner

SYSTEM AND METHOD FOR REAL TIME MONITORING A PLURALITY OF NETWORK DEVICES

CROSS-REFERENCE TO RELATED APPLICATION(S) AND PRIORITY

The present application claims priority from Indian Patent Application Number 202021005686 dated Feb. 10, 2020, the entirety of which is incorporated herein by a reference.

TECHNICAL FIELD

The present subject matter described herein, in general, relates to a system and a method for real time monitoring a plurality of network devices.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Network monitoring systems are typically employed on a large-scale corporates and university IT networks. The network monitoring systems ensure the availability and overall performance of computers and the network services. The network monitoring systems enable the admins to monitor or access routers, slow or failing components, firewalls, core switches, client systems, and server performance among other network data.

Existing fault management systems, network managers can set thresholds for critical network devices, such as hubs or routers. If the set thresholds exceed for critical devices, then the network manager monitors the current state of the network and its devices in order to detect network faults, isolate the cause of the fault, verify the fault, and resolve the underlying problem causing the fault to be reported, if possible. However, the existing fault management systems, the network managers fail to provide monitor granular data of the network devices in order to derive granular insights for identifying root cause of failure of the network device.

In Airline manufacturing industry, there are multiple departments of the infrastructure to handle the various aspects of designing, building, testing, selling, and maintaining of the air transport services. These multiple departments are engaged in handling multiple different infrastructure components with different technical specifications. Therefore, network monitoring of these kind of huge manufacturing industry is a difficult task due to lack of sophisticated system which can keep track of complete infrastructure components health and availability to accomplish their task well within time frame and with greater efficiency.

Further, the network teams need to view and interpret huge amount of information in order to understand their network's performance. However, for a network monitoring platform, the user interface (UI) needs to have clear distinctions between each performance metric report displayed on the network monitoring platform. Designing a clean, easy to understand UI is not an easy task. If this information isn't communicated with clear visual representations on the UI, the network monitoring platform will simply confuse and irritate end users. Existing network monitoring platforms fail to provide the UI which enable deep-dive approach to reach the root cause of any network problem and show the root cause of failure of event occurring in the network.

SUMMARY

This summary is provided to introduce concepts related to a system and a method for real time monitoring a plurality of network devices and the concepts are further described below in the detailed description. This summary is not intended to identify essential features of the claimed subject matter nor is it intended for use in determining or limiting the scope of the claimed subject matter.

In one implementation, a system for real time monitoring a plurality of network devices is disclosed. The system may comprise a processor and a memory coupled with the processor. The processor may be configured to execute programmed instructions stored in the memory. The processor may be configured to execute programmed instructions for polling granular data associated to a plurality of network devices at a periodic time interval based upon a plurality of predefined parameters. The processor may be configured to execute programmed instructions for processing and storing the granular data into a database communicatively coupled with the processor. The processor may be configured to execute programmed instructions for generating one or more structured queries based upon one or more of the plurality of predefined parameters to retrieve granular data associated to one or more network devices, of the plurality of network devices, stored in the database. The processor may be configured to execute programmed instructions for receiving a response corresponding to the one or more structured queries generated. The processor may be configured to execute instructions for comparing the response with a predefined criteria set for a key performance indicator (KPI) associated to each of the one or more network devices. The processor may be configured to execute programmed instructions for updating a user interface (UI) component using an update query based upon the comparison of the response with the predefined criteria. The processor may be configured to execute instructions for displaying real time insights on a graphical user interface (GUI) associated to a user based upon the updated UI component to enable real time monitoring of the performance of the one or more network devices.

In another implementation, a method for real time monitoring a plurality of network devices is disclosed. The method may comprise polling, via a processor, granular data associated to a plurality of network devices at a periodic time interval based upon a plurality of predefined parameters. The method may further comprise processing and storing, via the processor, the granular data into a database communicatively coupled with the processor. The method may further comprise generating, via the processor, one or more structured queries based upon one or more of the plurality of predefined parameters to retrieve granular data associated to one or more network devices, of the plurality of network devices, stored in the database. The method may further comprise receiving, via the processor, a response corresponding to the one or more structured queries generated. The method may further comprise comparing, via the processor, the response with a predefined criteria set for a key performance indicator (KPI) associated to each of the one or more network devices. The method may further comprise updating, via the processor, a user interface (UI)

component using an update query based upon the comparison of the response with the predefined criteria. The method may further comprise displaying, via the processor, real time insights on a graphical user interface (GUI) associated to a user based upon the updated UI component to enable real time monitoring of the performance of the one or more network devices.

In yet another implementation, a non-transitory computer readable medium storing a program for real time monitoring a plurality of network devices is disclosed. The program may comprise programmed instructions for polling granular data associated to a plurality of network devices at a periodic time interval based upon a plurality of predefined parameters. The program may further comprise programmed instructions for processing and storing the granular data into a database communicatively coupled with the processor. The program may further comprise programmed instructions for generating one or more structured queries based upon one or more of the plurality of predefined parameters to retrieve granular data associated to one or more network devices, of the plurality of network devices, stored in the database. The program may further comprise programmed instructions for receiving a response corresponding to the one or more structured queries generated. The program may further comprise programmed instructions for comparing the response with a predefined criteria set for a key performance indicator (KPI) associated to each of the one or more network devices. The program may further comprise programmed instructions for updating a user interface (UI) component using an update query based upon the comparison of the response with the predefined criteria. Further, the program may comprise programmed instructions for displaying real time insights on a graphical user interface (GUI) associated to a user based upon the updated UI component to enable real time monitoring of the performance of the one or more network devices.

BRIEF DESCRIPTION OF DRAWINGS

The detailed description is described with reference to the accompanying Figures. The same numbers are used throughout the drawings to refer like features and components.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
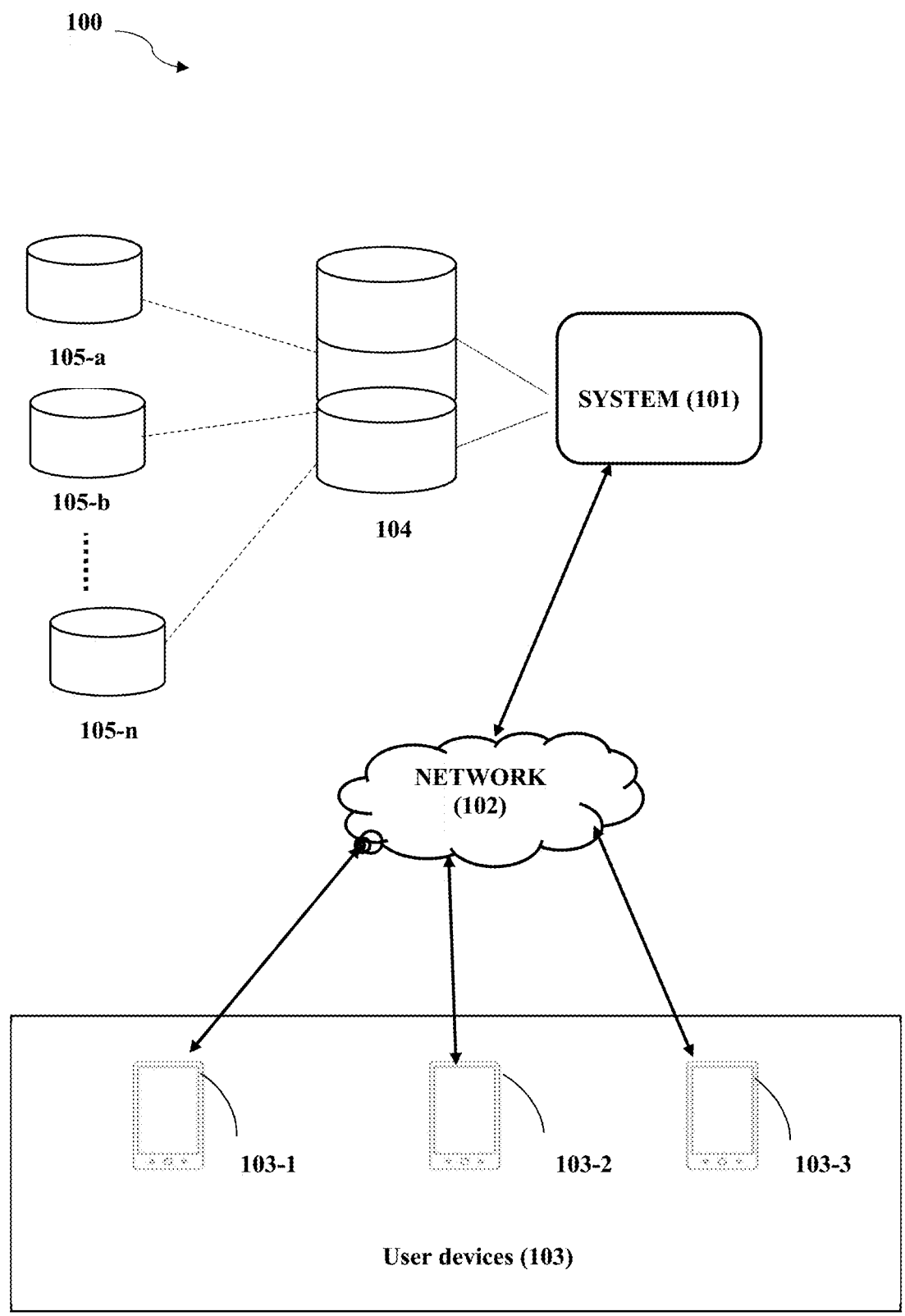
FIG. 1 illustrates a network implementation 100 of a system 101 for real time monitoring a plurality of network devices, in accordance with an embodiment of the present disclosure.

Referring to FIG. 1, a network implementation (100) of system (101) for real time monitoring a plurality of network devices is illustrated, in accordance with an embodiment of the present subject matter. In one embodiment, the system (101) may be communicatively coupled with the database (104).

In an embodiment, the system (101) may be connected to a user device (103) over a network (102). It may be understood that the system (101) may be accessed by multiple users through one or more user devices (103-1), (103-2), (103-3) ... (103-n), collectively referred to as a user device (103). The user device (103) may be any electronic device, communication device, image capturing device, machine, software, automated computer program, a robot or a combination thereof.

In an embodiment, though the present subject matter is explained considering that the system (101) is implemented on a server, it may be understood that the system (101) may also be implemented in a variety of user devices, such as, but not limited to, a portable computer, a personal digital assistance, a handheld device, a mobile, a laptop computer, a desktop computer, a notebook, a workstation, a mainframe computer, a mobile device, and the like. In one embodiment, system (101) may be implemented in a cloud-computing environment. In an embodiment, the network (102) may be a wireless network such as Bluetooth, Wi-Fi, 3G, 4G/LTE and alike, a wired network or a combination thereof. The network (102) can be accessed by the user device (103) using wired or wireless network connectivity means including updated communications technology.

In one embodiment, the network (102) can be implemented as one of the different types of networks, cellular communication network, local area network (LAN), wide area network (WAN), the interne, and the like. The network (102) may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network (102) may include a variety of network devices, including routers, bridges, servers, computing devices, storage devices, and the like.

Figure 2:
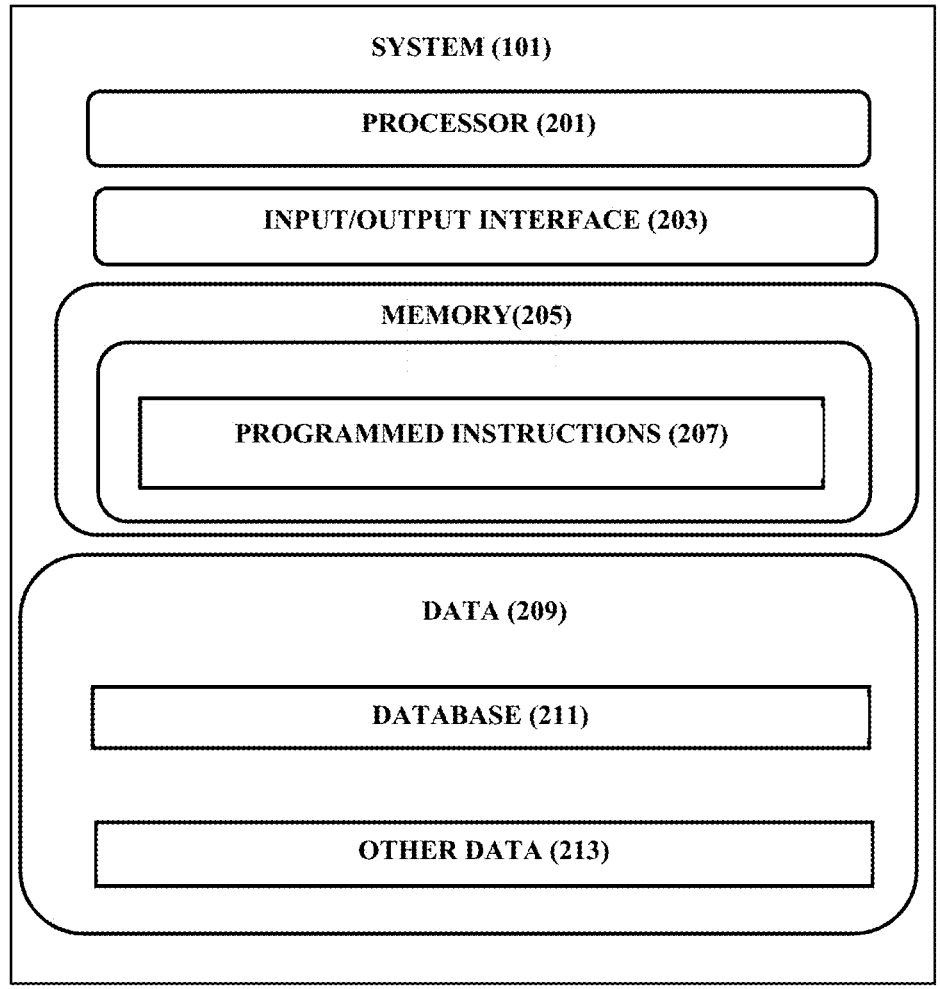
FIG. 2 illustrates components of the system 101 facilitating real time monitoring a plurality of network devices, in accordance with the embodiment of the present disclosure.
Figure 3:
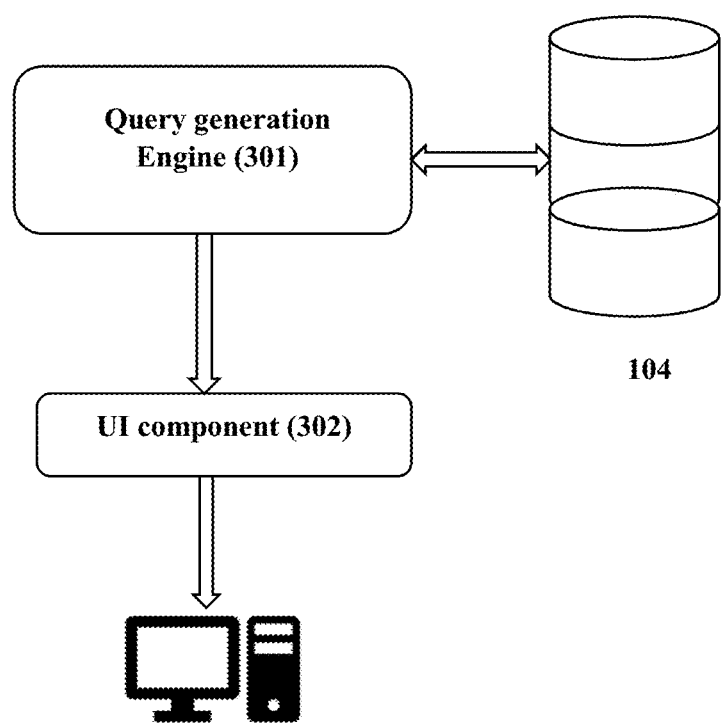
FIG. 3 illustrates an implementation 300 of query generation engine for real time monitoring a plurality of network devices, in accordance with the embodiment of the present disclosure.

Further, referring to FIG. 2, various components of the system (101) are illustrated, in accordance with an embodiment of the present subject matter. As shown, the system (101) may include at least one processor (201), an input/output interface (203), a memory (205), programmed instructions (207) and data (209). In one embodiment, the at least one processor (201) is configured to fetch and execute computer-readable instructions stored in the memory (205).

In one embodiment, the I/O interface (203) implemented as a mobile application or a web-based application and may further include a variety of software and hardware interfaces, for example, a web interface, a graphical user interface, and the like. The I/O interface (203) may allow the system (101) to interact with the user devices (103). Further, the I/O interface (203) may enable the user device (103) to communicate with other computing devices, such as web servers and external data servers (not shown). The I/O interface (203) can facilitate multiple communications within a wide variety of networks and protocol types, including wired networks, for example, LAN, cable, etc., and wireless networks, such as WLAN, cellular, or satellite. The I/O interface (203) may include one or more ports for connecting to another server. In an exemplary embodiment, the I/O interface (203) is an interaction platform which may provide a connection between users and system (101).

In an implementation, the memory (205) may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and memory cards. The memory (205) may include data (209).

In one embodiment, the programmed instructions (207) may include, routines, programmes, objects, components, data structures, etc. which perform particular tasks, functions, or implement particular abstract data types. The data (209) may comprise a database (211) and other data (213). In one embodiment, the database (211) may store processed granular data associated to the plurality of network devices. The other data (213) amongst other things, serves as a repository for storing data processed, received, and generated by one or more components and programmed instructions.

The aforementioned computing devices may support communication over one or more types of networks in accordance with the described embodiments. For example, some computing devices and networks may support communications over a Wide Area Network (WAN), the Internet, a telephone network (e.g., analog, digital, POTS, PSTN, ISDN, xDSL), a mobile telephone network (e.g., CDMA, GSM, NDAC, TDMA, E-TDMA, NAMPS, WCDMA, CDMA-2000, UMTS, 3G, 4G), a radio network, a television network, a cable network, an optical network (e.g., PON), a satellite network (e.g., VSAT), a packet-switched network, a circuit-switched network, a public network, a private network, and/or other wired or wireless communications network configured to carry data. Computing devices and networks also may support wireless wide area network (WWAN) communications services including Internet access such as EV-DO, EV-DV, CDMA/1×RTT, GSM/GPRS, EDGE, HSDPA, HSUPA, and others.

The aforementioned computing devices and networks may support wireless local area network (WLAN) and/or wireless metropolitan area network (WMAN) data communications functionality in accordance with Institute of Electrical and Electronics Engineers (IEEE) standards, protocols, and variants such as IEEE 802.11 ("WiFi"), IEEE 802.16 ("WiMAX"), IEEE 802.20x ("Mobile-Fi"), and others. Computing devices and networks also may support short range communication such as a wireless personal area network (WPAN) communication, Bluetooth® data communication, infrared (IR) communication, near-field communication, electromagnetic induction (EMI) communication, passive or active RFID communication, micro-impulse radar (MIR), ultra-wide band (UWB) communication, automatic identification and data capture (AIDC) communication, and others.

The working of the system (101) for real time monitoring a plurality of network devices will now be described in detail referring to FIGS. 1, 2, 3 and 4 as below:

In one embodiment, the processor (201) may be configured for polling granular data associated with a plurality of network devices (105-a, 105-b . . . 105-n) at a periodic time interval based upon a plurality of predefined parameters. In one embodiment, the plurality of network device (105-a, 105-b . . . 105-n) may comprise at least a network server, a data center, an Internet Service Provider (ISP), a web server, a cloud server, an infrastructure platform, an electronic device, and a communication device. In one embodiment, the plurality of network devices may be the devices which are a part of the infrastructure of the monitoring site. In one embodiment, the plurality of predefined parameters enabling the polling of the granular data associated to the plurality of network devices (105-a, 105-b . . . 105-n) may comprise total ports on each network device, ports used by each network device, free ports on each network device, available ports on each network device, a vendor associated to each network device, location of each network device, and a category of each network device, and type of each network device.

In one embodiment, the processor (201) may be configured for processing and storing the granular data associated with a plurality of network devices into a database (211). In one embodiment, the processor (201) may be configured to store the granular data associated to the plurality of network devices in the database. In one embodiment, the database may be an external database (104) communicatively coupled with the processor (201).

In one embodiment, the processor (201) may be configured for generating one or more structured queries based upon one or more of the plurality of predefined parameters to retrieve granular data associated to one or more network devices, of the plurality of network devices, stored in the database (211). In one embodiment, one or more structured queries may assist in generating tabular data depicting department wise availability, month wise availability along with capturing insights of a particular day of the month.

In accordance with a first exemplary embodiment, the processor (201) may be configured to generate structured queries to retrieve department wise availability with granular data. In this first exemplary embodiment, the structured query may comprise SELECT statement to retrieve granular data of department, date and time of a month from the database. Further, in this first exemplary embodiment, the structured query may comprise CONCAT function to set the colour of the button for displaying status of one or more network devices based upon average availability condition. For instance, when average availability is greater than or equal to 99, then colour of the button is set as "Green". In another scenario, when average availability is greater than or equal to 98 and less than 99, then colour of button is set as "Orange". In yet another scenario, when average availability is equal to zero, then colour of the button is set as "Gray". In still another scenario, when average availability is greater than zero and less than 98, then colour of the button is set as "red". Further, in this first exemplary embodiment, the structured query may comprise INNER JOIN function which allows to query granular data from a plurality of tables comprising but not limited to Node/network device ID, caption, IP address, site code, Equipment/network device category, department. Furthermore, in this first exemplary embodiment, the structured query may comprise GROUP BY function to arrange identical data into same department group.

In accordance with a second exemplary embodiment, the processor (201) may be configured to generate structured query to retrieve equipment category with granular data. In this second exemplary embodiment, the structured query may comprise SELECT statement to retrieve granular data of Equipment category description, date and time of a month. Further, in this second exemplary embodiment, the structured query may comprise CONCAT function to set the colour of the button for displaying status of one or more network devices based upon average availability condition. In one scenario, when average availability is greater than or equal to 99, then colour of the button is set as "Green". In another scenario, when average availability is greater than or equal to 98 and less than 99, then colour of button is set as "Orange". In yet another scenario, when average availability is equal to zero, then colour of the button is set as "Gray". In still another scenario, when average availability is greater than zero and less than 98, then colour of the button is set as "red". Further, in this second exemplary embodiment, the structured query may comprise INNER JOIN function which allows to query granular data from a plurality of tables comprising but not limited to Node/network device ID, caption, IP address, site code, Equipment/network device category, department. Furthermore, in this second exemplary embodiment, the structured query may comprise GROUP BY function to arrange identical data into same group of equipment category.

In accordance with a third exemplary embodiment, the processor (201) may be configured to generate structured queries to retrieve port capacity with granular data. In this third exemplary embodiment, the structured query may comprise SELECT statement to retrieve granular data of port capacity count, active port capacity count, available ports, port capacity percent used, and available port percentage used. Further, in this third exemplary embodiment, the structured query may comprise INNER JOIN function allows to query granular data from a plurality of tables comprising but not limited to Node/network device ID, Department, Vendor, node/network device type, Vendor Icon from Nodes/network devices etc. Further, in this third exemplary embodiment, the structured query may comprise WHERE function to specify the department from which granular data is retrieved. Further, in this third exemplary embodiment, the structured query may comprise ORDER BY function to retrieve port capacity percentage in descending order. Furthermore, in this third exemplary embodiment, the structured query may be used to track the usage of switch ports which can help network administrators troubleshoot current problem or plan for future network upgrade. Now referring to FIG. 3, a query generation engine (301) configured for generating one or more structured queries based upon one or more of the plurality of predefined parameters is illustrated. In one embodiment, the query generation engine (301) may be stored in the memory (205). In one exemplary embodiment, one or more structured queries may be generated in Microsoft structured query language (MS SQL) at a periodic time interval automatically. In one embodiment, the periodic time interval may include but not limited to a specific time of a day, days, weeks, months etc. In one scenario, the query generation engine (301) may be configured to generate one or more structured queries for monitoring of the plurality of network devices of a specific department of the manufacturing industry. The query generation engine (301) may generate one or more structured queries based upon total ports on each network device, ports used by each network device, free ports on each network device, available ports on each network device, a vendor associated to each network device, location of each network device, and a category of each network device, and type of each network device to retrieve granular data associated to one or more network devices, of the plurality of network devices, stored in the database (211) or database (104). In one embodiment, the query generation engine (301) may generate one or more structured queries to retrieve statistics of granular data associated to one or more network devices, of the plurality of network devices, using a Node Package Manager (NPM) or a net flow module stored in memory (205). The NPM may be configured to capture statistical granular data and manage dependency of the plurality of network devices and conflicts intelligently. The net flow module may be configured to capture granular data from continuous streams of network traffic and convert the granular data into easy to-interpret charts and tables to monitor one or more network devices, of the plurality of the network devices.

In one embodiment, the processor (201) may be configured for receiving a response corresponding to the one or more structured queries generated. In one embodiment, the processor (201) may be configured for receiving response corresponding to the one or more structured queries from one or more network devices of the plurality of the network devices. The processor (201) may be configured for comparing the response with a predefined criteria set for a key performance indicator (KPI) set for each of the one or more network devices. In one embodiment, the predefined criteria set may be selected from a group comprising but not limited to a predefined threshold values (e.g. an upper limit, a lower limit, etc) or predefined rules. In one exemplary embodiment, the data extracted from one or more network devices may be filtered by customized code such as java script function and SWQL Queries.

In one embodiment, the processor (201) may be configured for updating a user interface (UI) component (302) using an update query based upon the comparison of the response with the predefined criteria. In one embodiment, the update query may correspond to the change in the status of the one or more network devices. In one exemplary embodiment, when the one or more network devices of the plurality of the network devices start to lose available ports then the processor (201) may be configured for updating the UI component (302) using the update query for changing the colour from green to orange. Further, if the one or more network devices of the plurality of the network devices fails to provide available ports then the processor (201) may be configured for updating the UI component (302) using the update query for changing the colour from orange to red.

In one embodiment, the processor (201) may be configured for displaying real time insights on a graphical user interface (GUI) associated to a user based upon the updated UI component (302) to enable real time monitoring of the performance of the one or more network devices. In one embodiment, the real time insights displayed may be indicative of performance of the one or more network devices over a predefined time interval. In one embodiment, the performance may be indicated via graphical and/or metrics to determine holistic view of the performance of the one or more network devices over a predefined time interval. In one embodiment, the real time insights may depict one or more of network lag, link behaviour, network loss, up and/or down of a network device, and packet loss, and wherein the real time insights enable real time triggering of alerts to stakeholders, automated troubleshooting and implementing corrective and/or preventive measures for each network device based upon the performance monitored for each network device. In one embodiment, the real time insights may provide report and alert in relation with IT service management (ITSM). In one embodiment, an ITSM tool may be configured to generate the alert and tickets. The processor (201) may be configured to trigger real time alert on a dashboard of the system (101) based upon comparison of the response of the one or more structured queries with a threshold for KPIs such as node down, utilization, port capacity.

In one exemplary embodiment, the processor (201) may be configured for real time monitoring of the plurality of network devices which are part of an Airline manufacturing industry. In the Airline manufacturing industry, there are multiple departments of the infrastructure to handle the various aspects of designing, building, testing, selling, and maintaining of the air transport services. These multiple departments are engaged in handling multiple different infrastructure components or the plurality of network devices with different technical specifications. In one embodiment, the plurality of network devices may comprise at least the network server, the data center, the Internet Service Provider (ISP), the web server, the cloud server, the infrastructure platform, the electronic device, and the communication device, switches, Routers, Firewalls, CISCO® devices, Wireless controller, WAN circuit, Helicopter manufacturing devices, Airplane manufacturing devices, training devices. In one embodiment, the processor (201) may be configured polling granular data associated to the plurality of network devices at the periodic time interval based upon the plurality of predefined parameters comprising the total ports on each network device, ports used by each network device, free ports on each network device, available ports on each network device, the vendor associated to each network device, location of each network device, and the category of each network device, working of each network device at predefined time, configuration of each network device and type of each network device. The processor (201) may be configured for processing and storing the granular data associated with the plurality of network devices into the database (211). The processor (201) may be configured for generating one or more structured queries based upon one or more of the plurality of predefined parameters to retrieve granular data associated to one or more network devices, of the plurality of network devices, stored in the database (211). The processor (201) may be configured for receiving a response corresponding to the one or more structured queries generated. The processor (201) may be configured for updating a user interface (UI) component (302) using an update query based upon the comparison of the response with the predefined criteria. The processor (201) may be configured for displaying real time insights on the graphical user interface (GUI) associated to the user based upon the updated UI component (302) to enable real time monitoring of the performance of the one or more network devices. In one embodiment, the real time insights displayed may be indicative of performance of the one or more network devices over the predefined time interval. In one embodiment, the performance may be indicated via graphical and/or metrics to determine holistic view of the performance of the one or more network devices over the predefined time interval.

In one embodiment, the real time insights may be displayed into pie charts, categorized by month wise availability, department wise availability, network device wise availability.

In one embodiment, weather maps may be integrated using iframe to point to an active map on the GUI. In one embodiment, the real time insights may depict one or more of network lag, link behaviour, network loss, up and/or down of a network device, and packet loss, and wherein the real time insights enable real time triggering of alerts to stakeholders, automated troubleshooting and implementing corrective and/or preventive measures for each network device based upon the performance monitored for each network device. In one embodiment, network lag may be displayed based on the structured query generated to retrieve bandwidth utilization from IP address of the network devices. In one embodiment, network lag enables real time monitoring of the network devices.

In one embodiment, the processor (201) may be configured for displaying real time insights on the GUI comprising department wise availability, site wise availability, month wise availability, network device wise availability, capacity management, outages dashboard, network device wise category, different customized screens for availability with granularity and visualizations by graphs. For example, in accordance with a first exemplary embodiment, the processor (201) may be configured to display status of one or more network devices in red colour on the availability dashboard if the plurality of predefined parameters enabling the polling of the granular data associated to one or more network devices, of the plurality of network devices, is below the predefined threshold. In accordance with a second exemplary embodiment, the processor (201) may be configured to display status of one or more network devices in red colour on the availability dashboard if any outage occurs at one or more network devices of the plurality of network devices.

Figure 4:
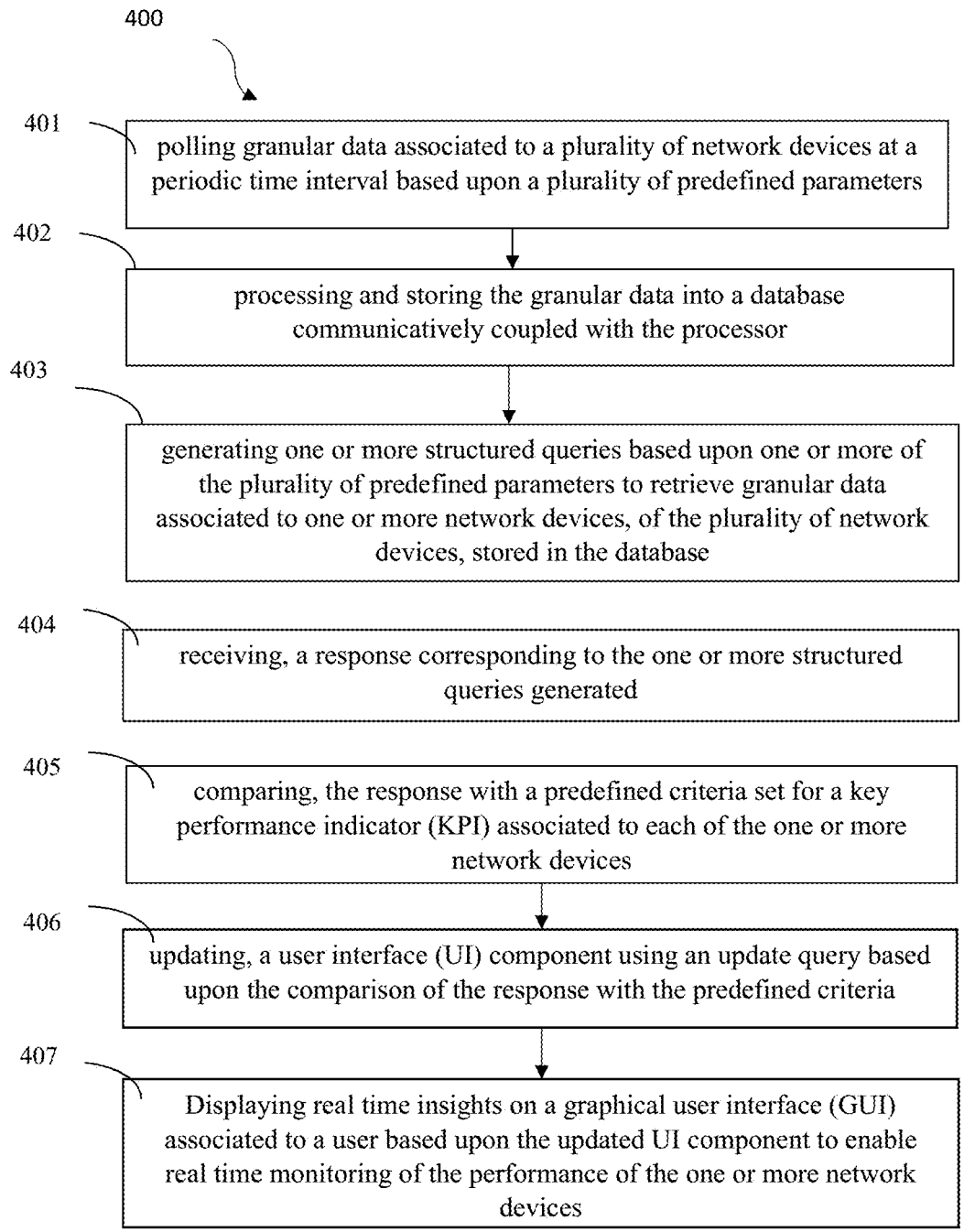
FIG. 4 illustrates a method 400 for real time monitoring a plurality of network devices, in accordance with an embodiment of the present disclosure.

Now referring to FIG. 4, the method 400 for real time monitoring a plurality of network devices is illustrated, in accordance with an embodiment of the present subject matter.

At step 401, the processor (201) may be configured for polling, granular data associated to the plurality of network devices at the periodic time interval based upon the plurality of predefined parameters.

At step 402, the processor (201) may be configured for processing and storing the granular data into the database communicatively coupled with the processor (201).

At step 403, the processor (201) may be configured for generating one or more structured queries based upon one or more of the plurality of predefined parameters to retrieve granular data associated to one or more network devices, of the plurality of network devices, stored in the database.

At step 404, the processor (201) may be configured for receiving a response corresponding to the one or more structured queries generated.

At step 405, the processor (201) may be configured for comparing the response with the predefined criteria set for the key performance indicator (KPI) associated to each of the one or more network devices.

At step 406, the processor (201) may be configured for updating the user interface (UI) component using an update query based upon the comparison of the response with the predefined criteria.

At step 407, the processor (201) may be configured for displaying real time insights on a graphical user interface (GUI) associated to a user based upon the updated UI component to enable real time monitoring of the performance of the one or more network devices.

In one embodiment, the system and method may be configured to derive granular real time insights on the GUI for identifying root cause of failure of the plurality of the network device.

In one embodiment, the system and method configured to show the KPI on a visual graphic way in form of charts and others which help the user to quickly identify the point of disruption in the network infrastructure.

In one embodiment, the system and method may be configured for capturing granularity which are described as capacity management and outage dashboard view.

In one embodiment, the capacity management may help to identify the root cause of failure of one or more network devices of the plurality of network devices with such minute details capturing such as ports used/unused.

In one embodiment, the outage dashboard may enable the user to find out the network device which has malfunction in complete month or any previous month of the year which helps the user to understand root cause of the Major Incidents which disrupt your network infrastructure.

In one embodiment, the outage dashboard may be customizable for allowing the network administrator to create tailor-made views to present data.

In one embodiment, the system and method may be configured for displaying real time insights on the multiple graphical user interfaces (GUIs).

In one embodiment, the system and method may be configured to enable the user to address issues immediately using data displayed in real-time in human readable format.

The embodiments, examples and alternatives of the preceding paragraphs or the description and drawings, including any of their various aspects or respective individual features, may be taken independently or in any combination. Features described in connection with one embodiment are applicable to all embodiments, unless such features are incompatible.

Although implementations for the system and the method for real time monitoring a plurality of network devices have been described in language specific to structural features and/or methods, it is to be understood that the approached claims are not necessarily limited to the specific features or methods described. Rather, the specific features and method are disclosed as examples of implementations for the system the method for real time monitoring a plurality of network devices.

What is claimed is:

1. A system for real time monitoring a plurality of network devices, comprising:
    a processor; and
    a memory coupled with the processor, wherein the processor is configured to execute programmed instructions stored in the memory for:
        polling granular data associated to a plurality of network devices at a periodic time interval based upon a plurality of predefined parameters;
        processing and storing the granular data into a database communicatively coupled with the processor;
        generating one or more structured queries based upon one or more of the plurality of predefined parameters to retrieve granular data associated to one or more network devices, of the plurality of network devices, stored in the database;
        receiving a response corresponding to the one or more structured queries generated;
        comparing the response with a predefined criteria set for a key performance indicator (KPI) associated to each of the one or more network devices;
        updating a user interface (UI) component using an update query based upon the comparison of the response with the predefined criteria; and
        displaying real time insights on a graphical user interface (GUI) associated to a user based upon the updated UI component to enable real time monitoring of the performance of the one or more network devices.

2. The system as claimed in claim 1, wherein the plurality of network device comprise at least a network server, a data center, an Internet Service Provider (ISP), a web server, a cloud server, an infrastructure platform, an electronic device, and a communication device, switches, Routers, Firewalls, CISCO® devices, Wireless controller, WAN circuit, Helicopter manufacturing devices, Airplane manufacturing devices, training devices.

3. The system as claimed in claim 2, wherein the plurality of predefined parameters enabling the polling of the granular data associated to the plurality of network devices comprises total ports on each network device, ports used by each network device, free ports on each network device, available ports on each network device, a vendor associated to each network device, location of each network device, working of each network device at predefined time, configuration of each network device and a category of each network device, and type of each network device.

4. The system as claimed in claim 1, wherein the real time insights displayed are indicative of performance of the one or more network devices over a predefined time interval, wherein the performance is indicated via graphical and/or metrics to determine holistic view of the performance of the one or more network devices over a predefined time interval.

5. The system as claimed in claim 4, wherein the real time insights depict one or more of network lag, link behaviour, network loss, up and/or down of a network device, and packet loss, and wherein the real time insights enable real time triggering of alerts to stakeholders, automated troubleshooting and implementing corrective and/or preventive measures for each network device based upon the performance monitored for each network device.

6. A method for real time monitoring a plurality of network devices, comprising:
    polling, via a processor, granular data associated to a plurality of network devices at a periodic time interval based upon a plurality of predefined parameters;
    processing and storing, via the processor, the granular data into a database communicatively coupled with the processor;
    generating, via the processor, one or more structured queries based upon one or more of the plurality of predefined parameters to retrieve granular data associated to one or more network devices, of the plurality of network devices, stored in the database;
    receiving, via the processor, a response corresponding to the one or more structured queries generated;
    comparing, via the processor, the response with a predefined criteria set for a key performance indicator (KPI) associated to each of the one or more network devices;
    updating, via the processor, a user interface (UI) component using an update query based upon the comparison of the response with the predefined criteria; and
    displaying, via the processor, real time insights on a graphical user interface (GUI) associated to a user based upon the updated UI component to enable real time monitoring of the performance of the one or more network devices.

7. The method as claimed in claim 6, wherein the plurality of network device comprise at least a network server, a data center, an Internet Service Provider (ISP), a web server, a cloud server, an infrastructure platform, an electronic device, and a communication device, switches, Routers, Firewalls, CISCO® devices, Wireless controller, WAN circuit, Helicopter manufacturing devices, Airplane manufacturing devices, training devices.

8. The method as claimed in claim 7, wherein the plurality of predefined parameters enabling the polling of the granular data associated to the plurality of network devices comprises total ports on each network device, ports used by each network device, free ports on each network device, available ports on each network device, a vendor associated to each network device, location of each network device, working of each network device at predefined time, configuration of each network device and a category of each network device, and type of each network device.

9. The method as claimed in claim 6, wherein the real time insights displayed are indicative of performance of the one or more network devices over a predefined time interval, wherein the performance is indicated via graphical and/or metrics to determine holistic view of the performance of the one or more network devices over a predefined time interval.

10. The method as claimed in claim 9, wherein the real time insights depict one or more of network lag, link behaviour, network loss, up and/or down of a network device, and packet loss, and wherein the real time insights enable real time triggering of alerts to stakeholders, automated troubleshooting and implementing corrective and/or preventive measures for each network device based upon the performance monitored for each network device.

11. A non-transitory computer readable medium comprising a program for real time monitoring a plurality of network devices, the program comprising programmed instructions for:
   polling granular data associated to a plurality of network devices at a periodic time interval based upon a plurality of predefined parameters;
   processing and storing the granular data into a database communicatively coupled with the processor;
   generating one or more structured queries based upon one or more of the plurality of predefined parameters to retrieve granular data associated to one or more network devices, of the plurality of network devices, stored in the database;
   receiving a response corresponding to the one or more structured queries generated;
   comparing the response with a predefined criteria set for a key performance indicator (KPI) associated to each of the one or more network devices;
   updating a user interface (UI) component using an update query based upon the comparison of the response with the predefined criteria; and
   displaying real time insights on a graphical user interface (GUI) associated to a user based upon the updated UI component to enable real time monitoring of the performance of the one or more network devices.

12. The non-transitory computer readable medium as claimed in claim 11, wherein the plurality of network device comprise at least a network server, a data center, an Internet Service Provider (ISP), a web server, a cloud server, an infrastructure platform, an electronic device, and a communication device, switches, Routers, Firewalls, CISCO® devices, Wireless controller, WAN circuit, Helicopter manufacturing devices, Airplane manufacturing devices, training devices.

13. The non-transitory computer readable medium as claimed in claim 12, wherein the plurality of predefined parameters enabling the polling of the granular data associated to the plurality of network devices comprises total ports on each network device, ports used by each network device, free ports on each network device, available ports on each network device, a vendor associated to each network device, location of each network device, working of each network device at predefined time, configuration of each network device and a category of each network device, and type of each network device.

14. The non-transitory computer readable medium as claimed in claim 11, wherein the real time insights displayed are indicative of performance of the one or more network devices over a predefined time interval, wherein the performance is indicated via graphical and/or metrics to determine holistic view of the performance of the one or more network devices over a predefined time interval.

15. The non-transitory computer readable medium as claimed in claim 14, wherein the real time insights depict one or more of network lag, link behaviour, network loss, up and/or down of a network device, and packet loss, and wherein the real time insights enable real time triggering of alerts to stakeholders, automated troubleshooting and implementing corrective and/or preventive measures for each network device based upon the performance monitored for each network device.

16. The system as claimed in claim 1, wherein the response, corresponding to the one or more structured queries, is received in form of a specific colour for displaying status of one or more network devices of the plurality of network devices, and wherein the response received in the specific colour is based upon an average availability condition.

17. The system as claimed in claim 16, wherein the average availability condition comprises displaying status of the one or more network devices in "Green", when the average availability is greater than or equal to 99, and wherein displaying status of the one or more network devices in "Orange", when the average availability is greater than or equal to 98 and less than 99, and wherein displaying status of the one or more network devices in "Gray", when the average availability is equal to zero, and wherein displaying status of the one or more network devices in "Red", when the average availability is greater than zero and less than 98.

18. The method as claimed in claim 6, wherein the response, corresponding to the one or more structured queries, is received in form of a specific colour for displaying status of one or more network devices of the plurality of network devices, and wherein the response received in the specific colour is based upon an average availability condition.

19. The method as claimed in claim 18, wherein the average availability condition comprises displaying status of the one or more network devices in "Green", when the average availability is greater than or equal to 99, and wherein displaying status of the one or more network devices in "Orange", when the average availability is greater than or equal to 98 and less than 99, and wherein displaying status of the one or more network devices in "Gray", when the average availability is equal to zero, and wherein displaying status of the one or more network devices in "Red", when the average availability is greater than zero and less.

20. The system as claimed in claim 1, wherein the updating the user interface (UI) component further comprising changing an existing colour of the one or more network devices to a different colour determined based on the average availability condition.

* * * * *